(12) United States Patent
Kleinman et al.

(10) Patent No.: US 7,980,800 B2
(45) Date of Patent: Jul. 19, 2011

(54) BLIND FASTENER AND METHOD OF REMOVING IT FROM A WORKPIECE

(75) Inventors: Jeffrey Ralph Kleinman, Luton (GB); Alan Edward Shawyer, Welwyn Garden City (GB)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 1058 days.

(21) Appl. No.: 10/545,908

(22) PCT Filed: May 11, 2004

(86) PCT No.: PCT/GB2004/002042
§ 371 (c)(1),
(2), (4) Date: May 23, 2006

(87) PCT Pub. No.: WO2004/102016
PCT Pub. Date: Nov. 25, 2004

(65) Prior Publication Data
US 2006/0251490 A1    Nov. 9, 2006

(30) Foreign Application Priority Data

May 14, 2003 (GB) .................................. 0311053.3
May 19, 2003 (GB) .................................. 0311368.5

(51) Int. Cl.
*F16B 13/06* (2006.01)
(52) U.S. Cl. ................. 411/43; 411/34; 411/45
(58) Field of Classification Search .............. 411/39, 411/40, 41, 42, 43, 44, 45, 46, 47, 48, 60.1, 411/34, 69
See application file for complete search history.

(56) References Cited

U.S. PATENT DOCUMENTS

| | | | |
|---|---|---|---|
| 2,527,307 A | 10/1950 | Huck | |
| 2,853,723 A | 9/1958 | Winslow | |
| 3,915,052 A * | 10/1975 | Ruhl | 411/361 |
| 4,432,679 A * | 2/1984 | Angelosanto et al. | 411/34 |
| 4,436,467 A * | 3/1984 | Larsson et al. | 411/34 |
| 4,781,501 A * | 11/1988 | Jeal et al. | 411/43 |
| 4,810,142 A * | 3/1989 | Briles | 411/43 |
| 4,850,771 A * | 7/1989 | Hurd | 411/43 |
| 4,865,499 A * | 9/1989 | Lacey | 411/34 |
| 4,907,922 A * | 3/1990 | Jeal et al. | 411/43 |
| 5,531,551 A | 7/1996 | Bowers | |
| 6,537,005 B1 * | 3/2003 | Denham | 411/42 |
| 2005/0260056 A1 * | 11/2005 | Denham | 411/43 |

FOREIGN PATENT DOCUMENTS

| | | |
|---|---|---|
| EP | 0 138 433 A1 | 4/1985 |
| EP | 1 103 732 A2 | 5/2001 |
| GB | 2 025 559 A | 1/1980 |
| GB | 2 288 648 A | 10/1995 |
| WO | WO 0233273 A1 * | 4/2002 |

* cited by examiner

*Primary Examiner* — Flemming Saether
(74) *Attorney, Agent, or Firm* — Hahn, Loeser & Parks LLP; Arland T. Stein (57) ABSTRACT

A blind fastener for insertion through an aperture in a workpiece, the fastener including a pin, a sleeve and an abutment member; wherein the abutment member can be removed from the sleeve so that the pin and sleeve can be forced out of the aperture, to remove the fastener therefrom, wherein the sleeve has a radially expanding head, which is received in a recess of the abutment member and wherein, prior to insertion of the fastener into the workpiece aperture, the abutment member is secured to the sleeve by deformation of part of the abutment member adjacent the recess over and into contact with the sleeve head.

3 Claims, 8 Drawing Sheets

BLIND FASTENER AND METHOD OF REMOVING IT FROM A WORKPIECE

RELATED/PRIORITY APPLICATION

This application is a National Phase filing regarding International Application No. PCT/GB2004/002042, which relies upon British Application Nos. 0311053.3 and 0311368.5 for priority.

TECHNICAL FIELD

The invention relates to a blind fastener, that is, one which can be installed by access to one side only of a workpiece. More particularly the invention relates to a blind fastener of the type comprising a pin, a sleeve, and an abutment member. In use of the fastener in a workpiece comprising two or more members to be secured together, the pin and sleeve are inserted through an aperture in the workpiece so that their remote end portions protrude beyond the remote or blind face of the workpiece. The application of axial compression to the sleeve by means of a pulling force on the pin with respect to the sleeve causes the protruding end portion of the sleeve to deform into a blind head which contacts the blind face of the workpiece. The workpiece is then compressed between the blind head and the abutment member and the abutment member is then secured to the pin e.g. by swaging, to secure the workpiece members together in the compressed condition.

BACKGROUND ART

There are alternative possible ways of providing the necessary mechanical engagement between the various component members of the fastener. The remote end of the pin may have a radially protruding head which contacts the end of the sleeve to apply compressive force to it, or the remote end of the pin may be in threaded engagement with the sleeve.

The abutment member is secured to the near end of the sleeve, to enable correct insertion of the fastener into the aperture through the workpiece.

One such fastener is that commercially available under the trade mark "HUCK BOM", which is described in U.S. Pat. No. 2,527,307. In this fastener, the abutment is in the form of a radially enlarged head integral with the sleeve.

In use, it is sometimes found that it is necessary to remove a fastener which has been installed in a workpiece, e.g. for servicing or repairing the equipment of which the workpiece forms a part. It is extremely difficult to do this, since the abutment member is swaged on to the pin, and is integral with the sleeve. The pin is too hard to drill out. In any event, it is unacceptable for removal of the fastener to cause damage to the adjacent part of the workpiece.

The present invention is intended to provide a fastener of this type which can, if needed, be removed more easily and conveniently.

DISCLOSURE OF INVENTION

The invention provides, in one of its aspects, a blind fastener for insertion through an aperture in a workpiece, the fastener comprising a pin, a sleeve and an abutment member; the pin extending inside the sleeve and engaging therewith at or near a first end of the sleeve; the sleeve having a radially expandable portion; the abutment member being adjacent the second end of the sleeve and projecting radially therefrom and the pin extending beyond the abutment member; whereby, when the sleeve is inserted into a suitable aperture in a workpiece of suitable thickness with the expandable portion of the sleeve protruding beyond the blind or remote face of the workpiece, and when a progressively increasing pulling force is applied to the part of the pin extending beyond the abutment member, the pulling force being supported against the abutment member, so that axial compression is applied to the sleeve between the abutment member and its engagement with the pin, the radially expandable part of the sleeve to radially expand to form a blind head in abutment with the remote face of the workpiece; thereby to apply compression to the workpiece between the blind head and the abutment member; and thereafter the abutment member can be secured to the pin; in which the abutment member is removable secured to the sleeve by means sufficiently strong to allow handling of the assembled fastener to be inserted in the aperture in the workpiece and installed therein, but sufficiently weak to allow the abutment member to be removed from the sleeve so that the pin and sleeve can be forced out of the aperture on the workpiece, to remove the fastener therefrom. Further features of the invention are a fastener in which the sleeve and abutment member are separate members and the removable securing means comprises deformation of at least one of them into engagement with the other; a fastener in which the sleeve has a radially extending head, the rim being insufficiently strong to prevent the sleeve being driven through the aperture, the abutment member has a corresponding recess in which the sleeve head is received, and part of the abutment member adjacent the recess is deformed over and into contact with the sleeve head; and a fastener in which the abutment member is deformed as aforesaid at a plurality of positions spaced apart around the sleeve head. The invention includes a method of removing a fastener from a workpiece which has been installed in the workpiece as aforesaid, which method comprises removing the abutment member from the sleeve, and then removing the pin and the sleeve through the blind side of the aperture.

BRIEF DESCRIPTION OF DRAWINGS

A specific embodiment for the invention will now be described by way of example and with reference to the accompanying drawings, in which.

DETAILED DESCRIPTION OF THE INVENTION

The pin, sleeve and abutment member all have circular symmetry.

Figure 1A:
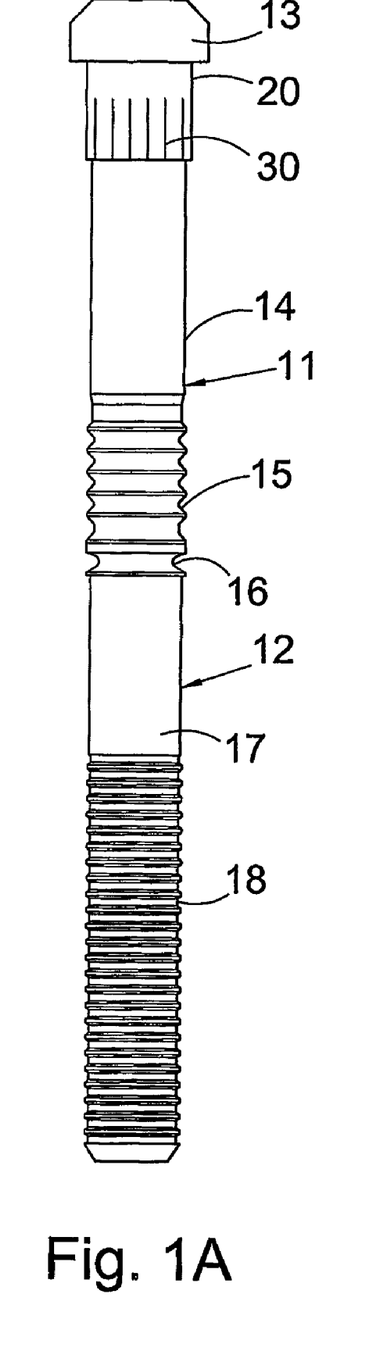
FIG. 1A is an outside elevation of the pin.

The pin 11 (FIG. 1A) is of medium carbon alloy steel and comprises an elongated cylindrical shank 12 with an integral radially enlarged head 13 at one end of the shank, by means of which the pin engages with one end of the sleeve. Adjacent the head 13 the pin shank has a slightly oversize portion 20 formed with longitudinal ribs 30. Next to this portion 20 is a plain portion 14, followed by a locking groove portion 15 and then a breakneck 16 which is the weakest part of the pin. Next to this there is another plain portion 17, followed by a pulling groove portion 18 which grooves are for engagement by the jaws of the fastener installation tool.

Figure 1B:
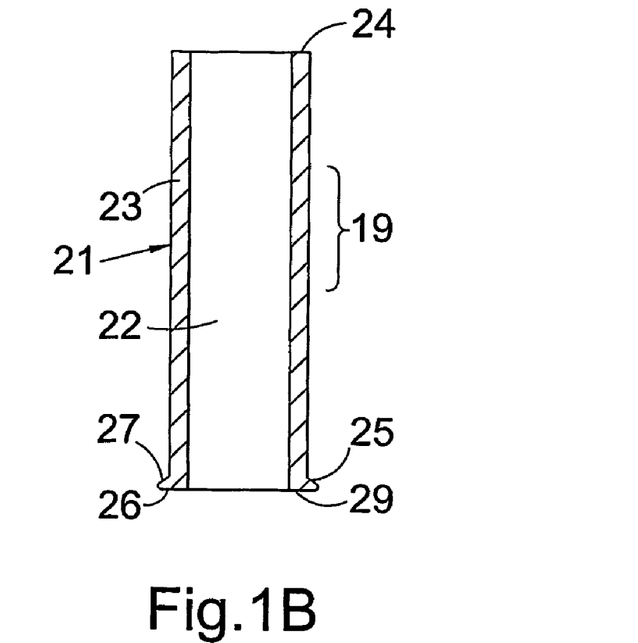
FIG. 1B is an axial section through the sleeve.

The sleeve 21 (FIG. 1B) is generally cylindrical and is made of low carbon steel. It has a through bore 22 of uniform diameter which is a sliding fit on the pin shank 12, and a cylindrical shank 23 which is of uniform external diameter. At one end (the tail end) the sleeve shank has a flat end face 24 and at the other end (the head end) an integrally formed slightly radially enlarged head 25. The sleeve head comprises a flange 26 having a conical underhead face 27. As illustrated in FIG. 1B, the head has a flat top face 29.

The sleeve shank includes a radially expandable portion which is centred on a softened zone 19 which, as indicated in FIG. 1B, in this example extends axially from a position about halfway along the length of the sleeve shank 21 to a position about three quarters of the way from the sleeve head 26 towards the sleeve tail 24. In this example, this softened portion 19 is made softer than the remainder of the sleeve by band annealing. It has a through bore 22 which is an interference fit on enlarged portion 20 of the pin shank 12.

Figure 1C:
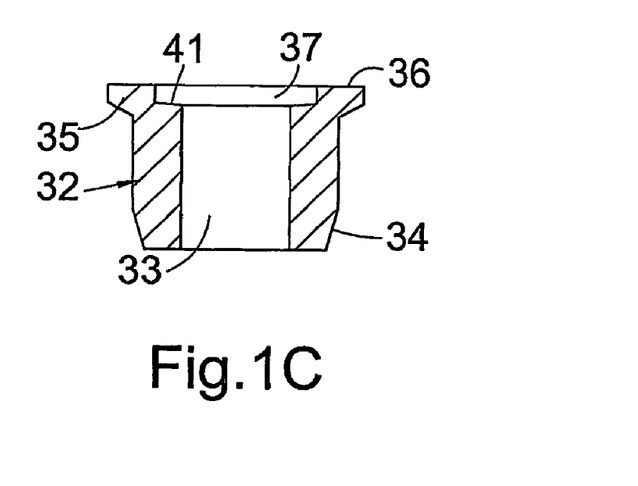
FIG. 1C is an axial section through the abutment member.

The abutment member (FIG. 1C) is in the form of a collar 32 made of medium carbon steel. The peripheral edge of one end of the collar has a bevel 34, whilst the other end has a radially projecting flange 35. That end face 36 is flat, but is annular, since it is provided with a recess 37, which is generally circular on the axis of the collar. The outer recess 37 is of a diameter and depth suitable to receive the head flange 26 of the sleeve, having an annular bottom face 41 which surrounds the recess 37. The axial depth of the recess 37 is rather greater than the total axial thickness of the sleeve head 26.

Figure 2A:
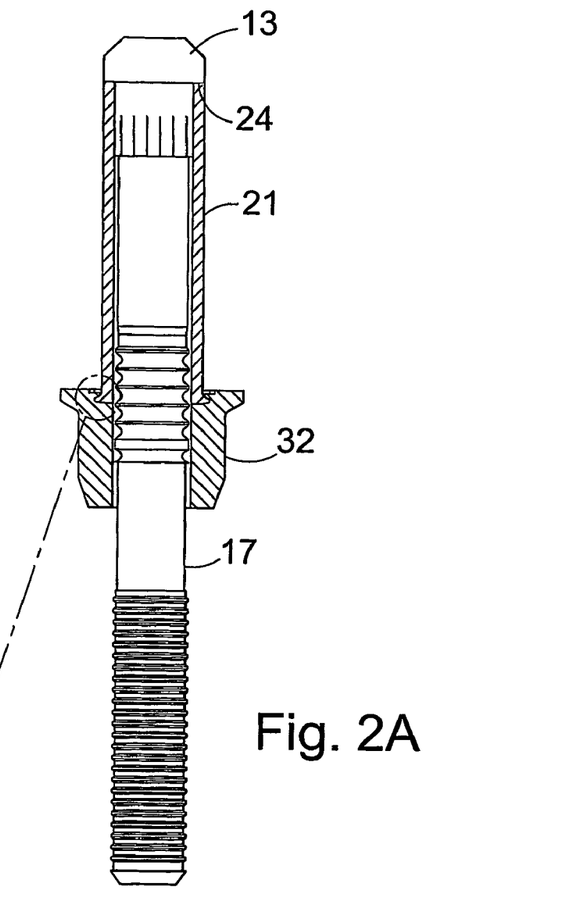
FIG. 2A shows those three parts assembled to form a fastener ready for installation.
Figure 2B:
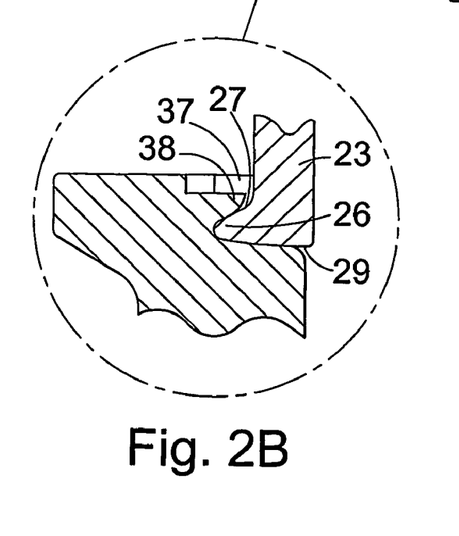
FIG. 2B is an enlargement of part of FIG. 2A.
Figure 2C:
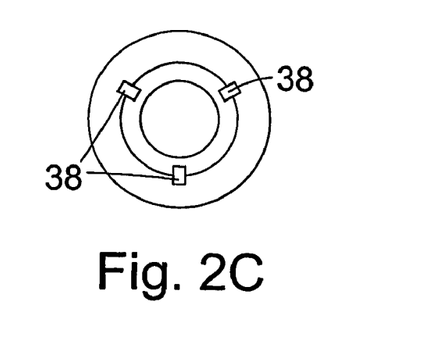
FIG. 2C is a plan view on FIG. 2A.

The pin, sleeve and collar are assembled together to form a fastener in the way illustrated in FIGS. 2A, 2B and 2C. The sleeve is assembled on the pin shank 12 so that the sleeve end face 24 abuts the annular face of the pin head 13, there being an interference fit between the ribbed oversize portion 20 of the pin and the tail end portion of the sleeve 21 beyond the softened zone 19. The collar 32 is then assembled on to the sleeve by inserting the sleeve head flange 26 into the collar recess 37 so that the sleeve head end face 29 contacts the annular face 41 of the collar recess. The sleeve and collar are then removably secured together by staking down the collar head adjacent the recess 37 at three positions around the periphery of the recess, to deform the head material at those positions over and into contact with the conical face 27 of the sleeve head, to form three lugs or projections 38. The pin plain portion 17 protrudes from the end face of the collar 32.

Figure 3A:
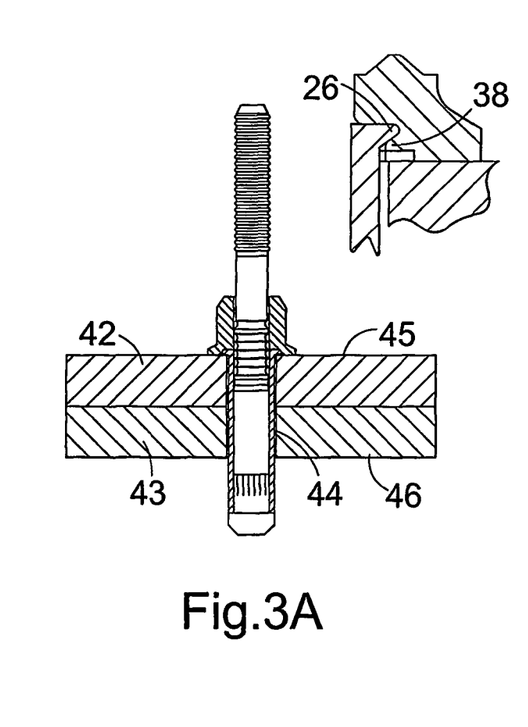
FIG. 3A is a section through a fastener inserted in an aperture in a workpiece, ready for installation therein, together with an enlargement of a detail thereof.

As illustrated in FIG. 3A, the fastener is used to secure together two structural metal panels 42, 43 which have a cylindrical aperture 44 through them in which the sleeve 21 is a clearance fit. The total thickness of the workpiece formed by the panels 42 and 43 is rather more than half of the length of the sleeve shank 23, so that the nearer end of the sleeve softened zone 19 indicated in FIG. 1B lies inside the remote face 46 of the workpiece when the underhead face 36 of the collar contacts the near face 45 of the workpiece.

As illustrated in the enlarged detail of FIG. 3A, the staked lugs 38 which contact the sleeve head flange 26 are undisturbed and continue to hold the sleeve and collar together.

Figure 3B:
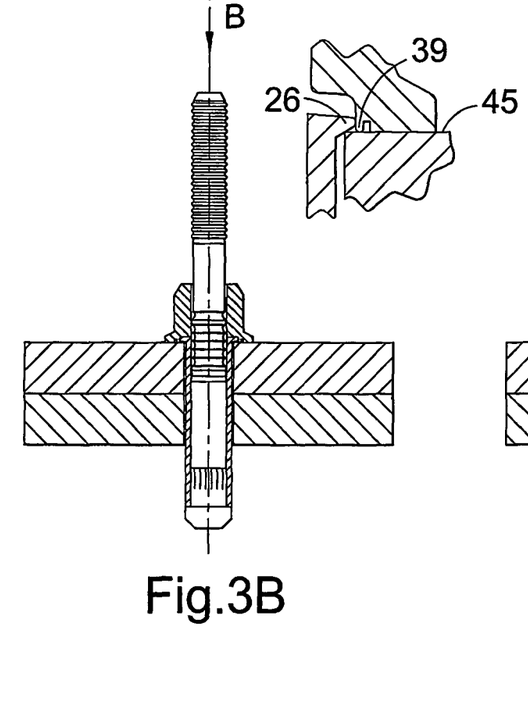
FIGS. 3B and 3C are similar to FIG. 3A but show other possible conditions which will be described below.
Figure 3C:
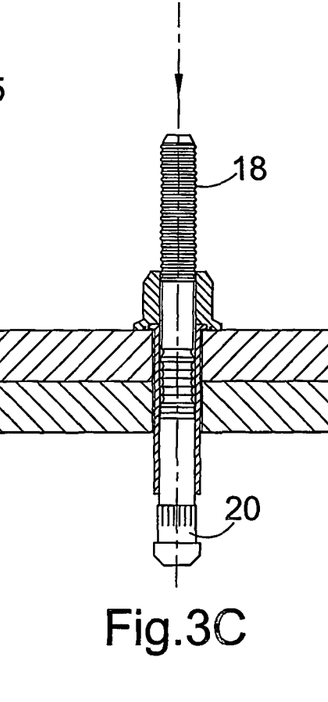

If however there is resistance to the insertion of the fastener sleeve into the aperture 44 on the workpiece (e.g. because the aperture 44 is undersize and produces an interference fit, or the two parts of the aperture 44 are mis-aligned not shown in FIGS. 3B and 3C), then it may be necessary to use force to insert the fastener, by axial force on the pin, as illustrated by the arrow B in FIG. 3B, e.g. by applying hammer blows to the projecting tail end of the pin. It is possible that this maybe sufficient to deform the staking lugs 38 in the way shown at 39 in FIG. 3B and its enlargement. The sleeve moves so that its head 26 contacts the near face 45 of the workpiece, the radial extent of the head 26 and its strength being sufficient to hold the sleeve in this position.

If a very large axial force has to be applied to the pin to make the sleeve enter the aperture, it is possible that the retaining force between the pin and sleeve, due to the interference fit between them at portion 20 of the pin, may be overcome, so that the pin moves axially through the sleeve and the interference portion 20 protrudes from the tail end of the sleeve, as illustrated in FIG. 3C. Provided that sufficient of the pin pulling groove position 18 remains outside the collar 32, it would still be possible to install the fastener in the way to be described below, but this might require two successive actuations of the installation tool.

If the pin is pushed too far into the sleeve, it cannot be installed, and the pin can be knocked completely through the sleeve. The collar can then be lifted off (since its connection to the sleeve has already been broken), and the sleeve punched through and out of the workpiece aperture. Alternatively the uninstalled fastener can be extracted by gripping and pulling the pin or the sleeve.

A fastener which has been inserted in a workpiece in the normal way as illustrated in FIG. 3A is now installed by applying a progressively increasing pull to the protruding part of the pin 11 in relation to the sleeve 21. This is done by means of a standard hydraulically-powered fastener placing tool, such as that commercially available under the designation AVDEL (Registered Trade Mark) Type 722, which is used for installing pin and collar type fasteners previously referred to.

The tool includes an annular anvil 47 (FIG. 4A) having an internal throat 48 shaped appropriately to swage the collar 32. The tool also includes jaws 49 which engage with the pulling grooves in the portion 18 of the pin, and a hydraulic piston and cylinder device (not shown) for applying a progressively increasing retraction force to the jaws with respect to the anvil. Such tools and their manner of use are well known to those who use blind fasteners, and need not be described in detail here.

Figure 4A:
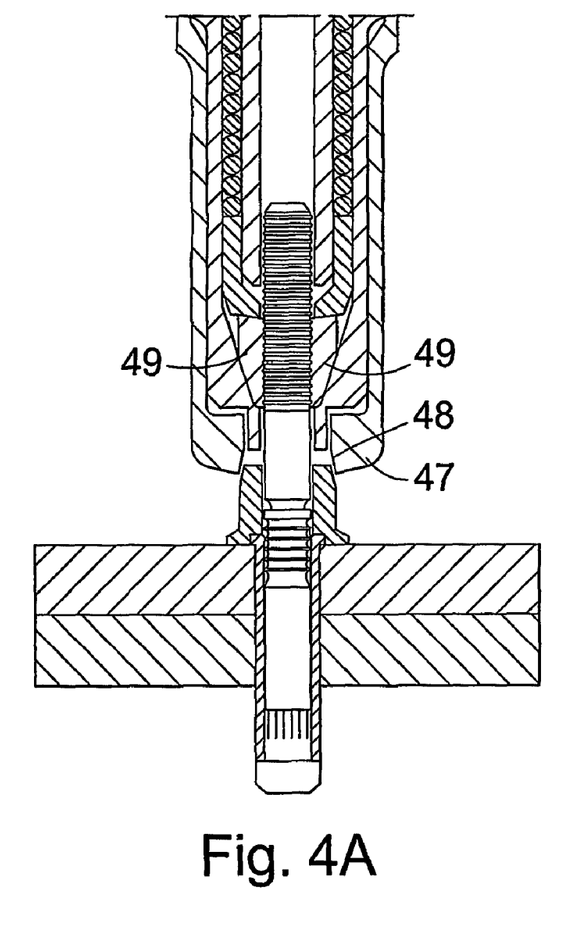
FIGS. 4A, 4B, 5A, 5B, 6A and 6B are similar to FIG. 3A, and show successive stages of the installation of the fastener.
Figure 4B:
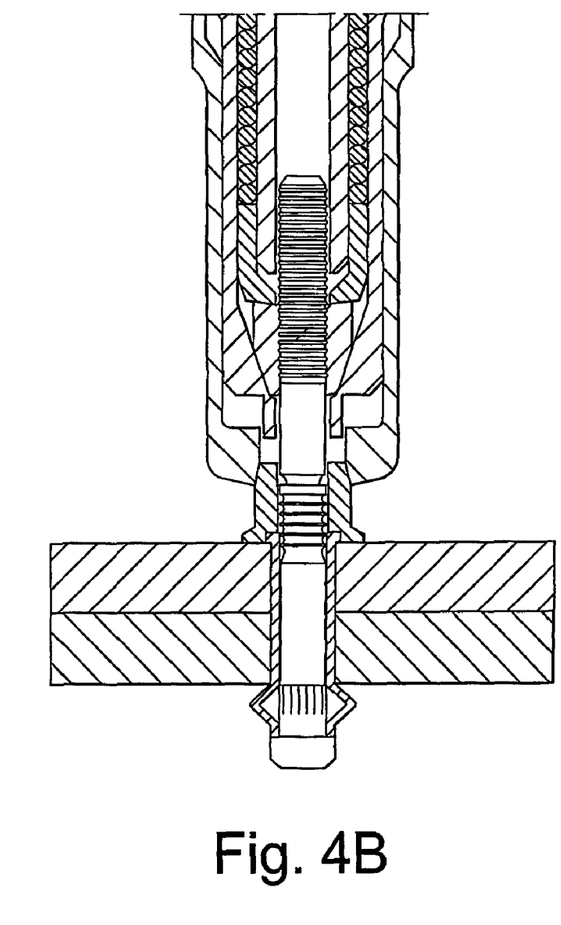
Figure 5A:
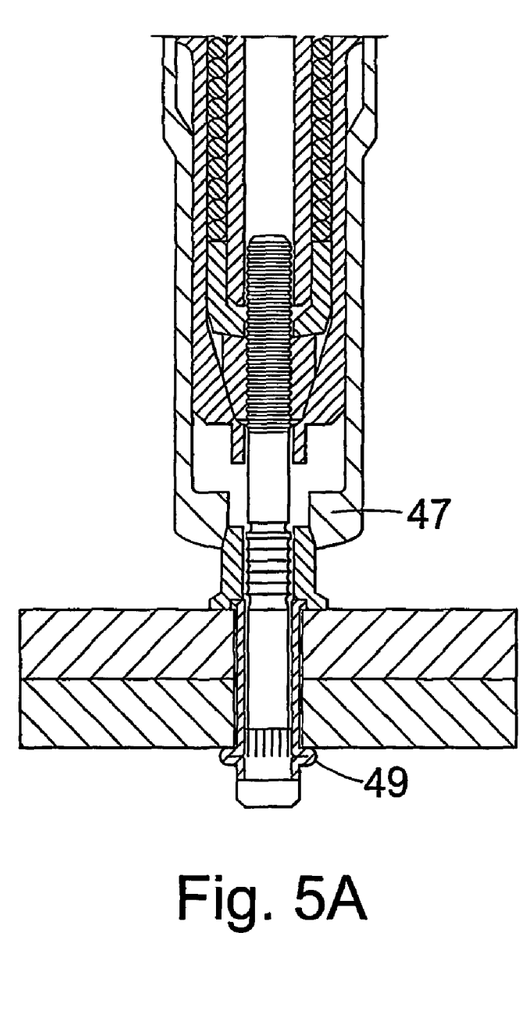

The tool is offered up to the protruding part of the pin, so that the outer end of the anvil throat contacts the top of the collar 32 around its bevel 34, as illustrated in FIG. 4A. The tool is then actuated so that its jaws engage the pulling groove portion 18 of the pin and exert a progressively increasing pull on it with respect to the anvil 47. The reaction force is transmitted through the collar 32 to its end face 36 against the workpiece, and thence via the annular face 41 face of the collar to the sleeve head 25. If, during insertion of the fastener into the aperture, the sleeve head 25 has moved away from the collar annular face 41, it will be pulled back into contact with it. The sleeve is thus axially compressed between the face of the head flange 26 and its end face 24 in contact with the pin head 13. The softened portion of the sleeve deforms by bulging outwardly, to progressively form a blind head in contact with rear face 46 of the workpiece. As the blind head progressively forms (See FIG. 4B), it exerts a compressive force on the rear face 46 of rear panel 43, which urges the panels 42, 43 together (and so closes any gap which may exist between them) so that the panels are firmly in contact with each other and compressed together between the collar end face 36 and the blind head. The final form of the blind head, in this example, is illustrated at 49 in FIG. 5A.

Figure 5B:
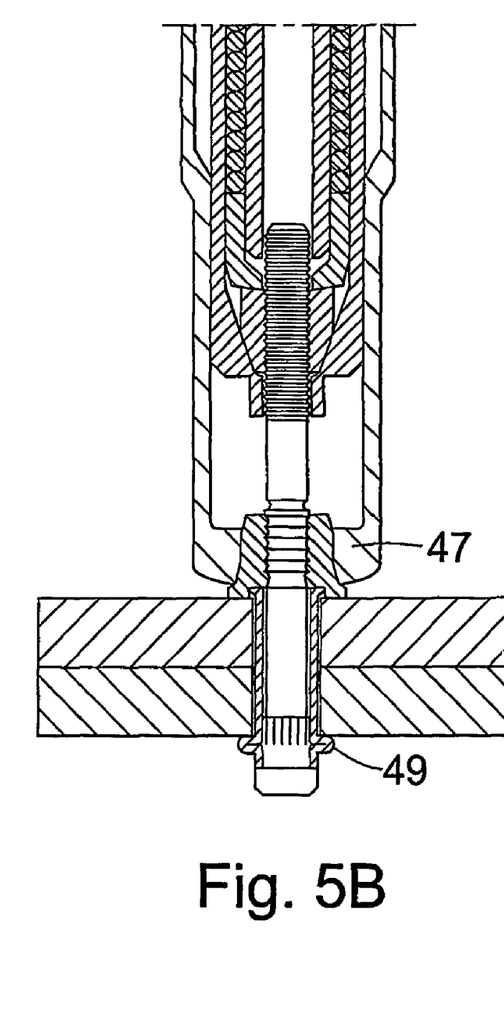

As the force applied by the tool further increases, the anvil 47 is pushed down over the exterior of the collar, so that the anvil throat 48 swages the collar 32 radially inwardly into the locking grooves 15 on the pin. The anvil stops with its lower face near the flange at the bottom of the collar. This position is illustrated in FIG. 5B.

Figure 6A:
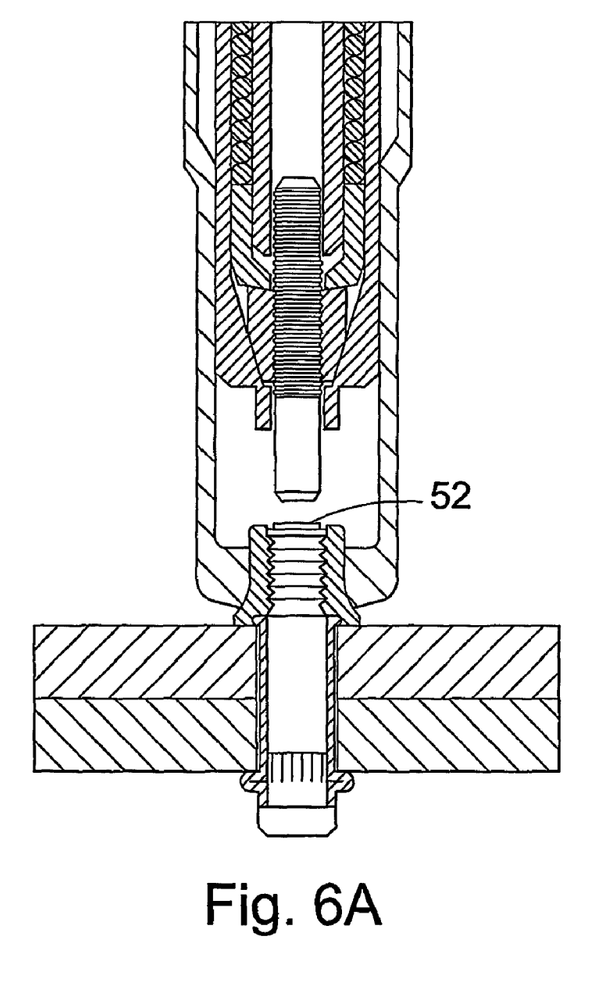
Figure 6B:
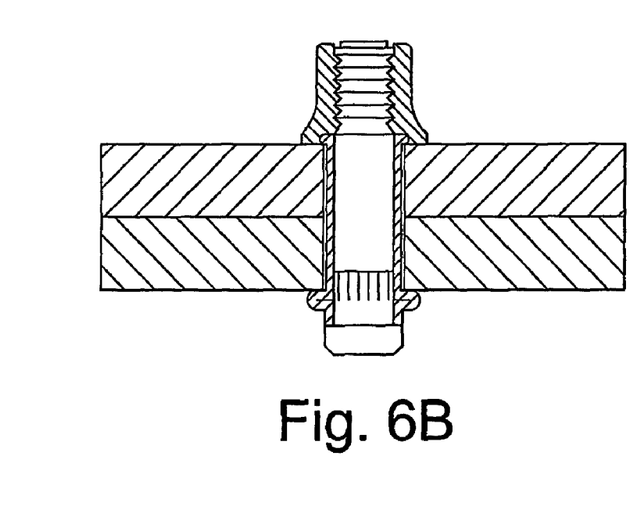

Further increase of the force applied by the tool causes the pin to break at the breakneck 16, the broken off pin tail being pulled away by the jaws, leaving a broken surface 52, as illustrated in FIG. 6A. The tool is then removed, to leave the installed fastener, as illustrated in FIG. 6B.

As previously mentioned, the fastener described above is advantageous in that an installed fastener can, if needed, be removed from the workpiece relatively easily.

Figure 7A:
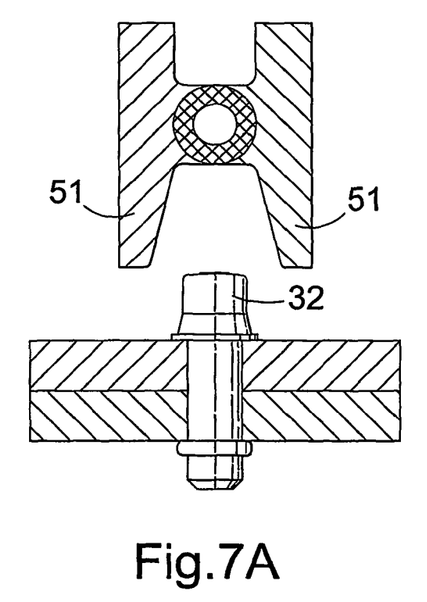
FIGS. 7A, 7B, 7D, 8A, 8B and 8C show successive stages of the removal of an installed fastener from the workpiece, FIG. 7C being a section on the line C-C of FIG. 7B.
Figure 7B:
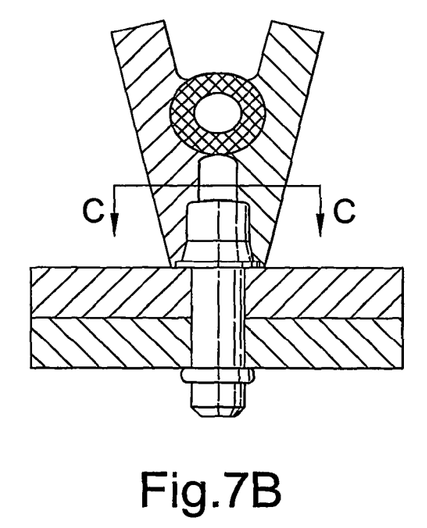
Figure 7C:
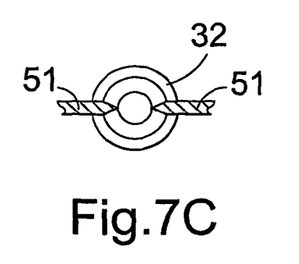

FIG. 7A shows a pair of bolt cropper blades 51 being offered up to the collar 32. These are located fully over the swaged collar, on a diametrical plane thereof, and the tool actuated to force the blades together so that they substantially cut the collar in half, as illustrated in FIGS. 7B and 7C.

Figure 7D:
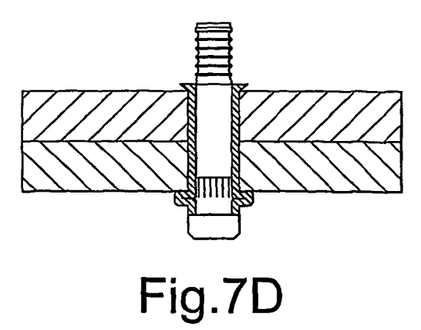

The two halves of the collar may remain connected together by thin pieces of its material, in which case the two halves of the collar can be separated and removed by a hammer and chisel or a power chisel, leaving the pin and sleeve in the workpiece as shown in FIG. 7D.

Figure 8A:
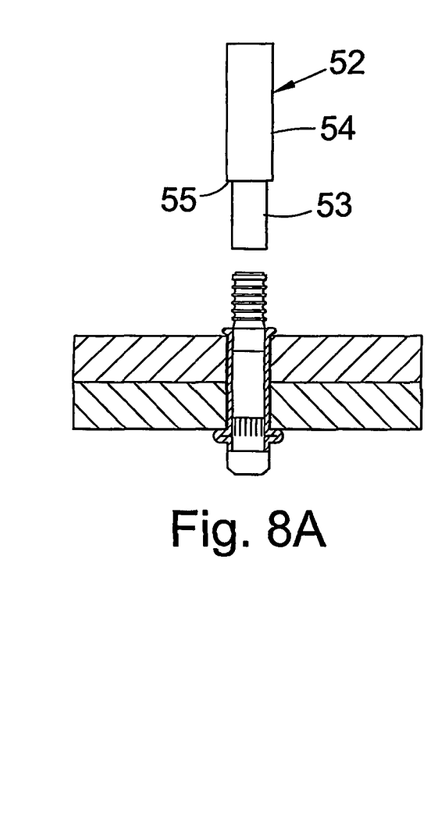
Figure 8B:
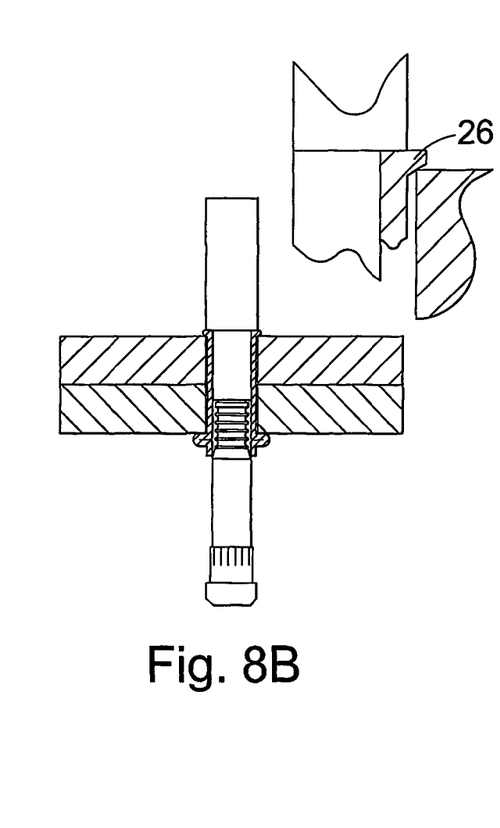
Figure 8C:
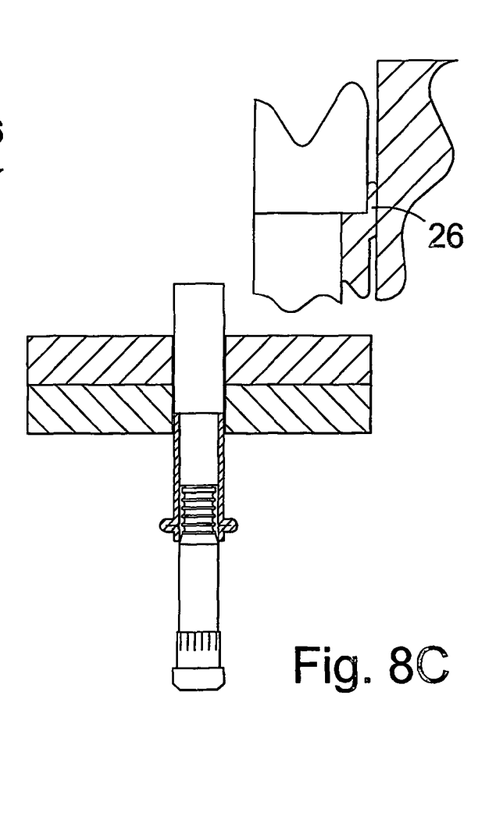

The pin and sleeve can then be removed from the workpiece, and this is conveniently done by using a single two-stage punch 52, as illustrated in FIGS. 8A, 8B and 8C. The punch comprises a leading narrower part 53 of appropriate diameter to enter the sleeve and push the pin, and a following wider part 54 having a diameter appropriate to enter the workpiece aperture, joined to the narrower part 53 by an annular face 55 appropriate to contact the sleeve head face. As shown in FIG. 8A, the punch portion 53 is offered up to the end of the fastener pin, and axial force applied by hammering, to break the interference fit between the pin and sleeve and drive the pin through the sleeve until the punch annular face contacts the sleeve head face 29, as shown in FIG. 8B including its enlarged detail. Application of further force to the punch deforms the outer peripheral part of the sleeve head flange 26, as shown in FIG. 8C and its enlarged detail (in some cases, the outer peripheral part may be sheared off). Further movement of the punch drives the sleeve and pin through the far end of the workpiece aperture, thus removing the installed fastener.

It will be apparent that, in order for the fastener to be installed and removed in the way described above, there must be the correct relationship between the various axial forces needed to separate various components. Thus, the axial force needed on the sleeve to separate it from the collar (by overcoming the staked lugs 38, as described with reference to FIG. 3B) must be less than the axial force needed to overcome the interference engagement between the pin and sleeve (as described with reference to FIGS. 3C and 8B), which in turn must be less than the force needed to push the sleeve head through the aperture (as described with reference to FIG. 8C).

The three measured force values for an example fastener of sleeve outside diameter 10 mm are respectively 900 Newtons, 1900 Newtons, and between 6000 Newtons (for an aperture of maximum diameter in which sleeve head folds up, FIG. 8C) and 9000 Newtons (for an aperture of minimum diameter).

The invention is not restricted to the details of the foregoing example. For instance, the sleeve and the abutment collar could be releasably connected to each other by any convenient arrangement.

The invention claimed is:

1. A blind fastener for insertion through an aperture in a workpiece, the fastener comprising a pin (11), a sleeve (21) and an abutment member (32);

the pin (11) extending inside the sleeve (21) and engaging therewith at or near a first end (24) of the sleeve;

the sleeve having a radially expandable portion;

the abutment member (32) being adjacent the second end (25) of the sleeve and projecting radially therefrom and the pin (11) extending beyond the abutment member (32);

whereby, when the sleeve (21) is inserted into a suitable aperture in a workpiece of suitable thickness with the expandable portion of the sleeve (21) protruding beyond a blind or remote face of the workpiece and the abutment member (32) abutting a near face of the workpiece, and when a progressively increasing pulling force is applied to the part of the pin (11) extending beyond the abutment member (32), the pulling force being supported against the abutment member (32), so that axial compression is applied to the sleeve (21) between the abutment member (32) and its engagement with the pin (11), the radially expandable part of the sleeve (21) is caused to radially expand to form a blind head in abutment with the remote face of the workpiece; thereby to apply compression to the workpiece between the blind head and the abutment member (32); and thereafter the abutment member can be secured to the pin (11);

in which, prior to insertion of the fastener into the workpiece aperture, the abutment member (32) is secured to the sleeve (21) by means sufficiently strong to allow handling of the assembled fastener to be inserted in the aperture in the workpiece and installed therein, but sufficiently weak to allow the abutment member (32) to be removed from the sleeve (21) so that the pin (11) and sleeve (21) can be forced out of the aperture on the workpiece, to remove the fastener therefrom, the sleeve (21) and abutment member (32) being separate members;

wherein the sleeve (21) has a radially extending head (25) which is insufficiently strong to prevent the sleeve being driven through the aperture, the abutment member has a corresponding recess (37) in which the sleeve head (25) is received, and wherein the securing means comprises deformation of part of the abutment member adjacent the recess, wherein the part of the abutment member which is deformed is caused to contact with the sleeve head (25) wherein the abutment member comprises at least one projection (38) which stakes the abutment member (32) to the sleeve (21) such that the pin (11), sleeve (21) and abutment member (32) are held together without having to be in contact with the workpiece and without having to have a pulling force applied to the pin (11).

2. A fastener as claimed in claim 1, in which the abutment member is deformed over and into contact with the sleeve head at a plurality of positions spaced apart around the sleeve head.

3. A blind fastener as claimed in claim 1 wherein the at least one projection is configured to be spaced away from the workpiece, but is configured to deform into contact with the workpiece during installation.

* * * * *